(12) United States Patent
Somma et al.

(10) Patent No.: US 12,533,438 B2
(45) Date of Patent: *Jan. 27, 2026

(54) METHOD FOR STERILIZING AND DECONTAMINATING POST-CONSUMER ABSORBENT SANITARY PRODUCTS POLLUTED WITH ORGANIC COMPOUNDS DERIVED FROM HUMAN METABOLISM

(71) Applicant: The Procter & Gamble Company, Cincinnati, OH (US)

(72) Inventors: Marcello Somma, Spoltore (IT); Giorgio Vaccaro, Spoltore (IT); Giorgio Pignalosa, Spoltore (IT); Nicola D'Alessio, Spoltore (IT); Tonino Caruso, Spoltore (IT); Laura Palombi, Spoltore (IT)

(73) Assignee: The Procter & Gamble Company, Cincinnati, OH (US)

( * ) Notice: Subject to any disclaimer, the term of this patent is extended or adjusted under 35 U.S.C. 154(b) by 943 days.

This patent is subject to a terminal disclaimer.

(21) Appl. No.: 17/621,729

(22) PCT Filed: May 20, 2020

(86) PCT No.: PCT/IB2020/054771
§ 371 (c)(1),
(2) Date: Dec. 22, 2021

(87) PCT Pub. No.: WO2020/260972
PCT Pub. Date: Dec. 30, 2020

(65) Prior Publication Data
US 2022/0257823 A1 Aug. 18, 2022

(30) Foreign Application Priority Data

Jun. 25, 2019 (IT) .................. 102019000010062

(51) Int. Cl.
| | | |
|---|---|---|
| A61L 11/00 | (2006.01) |
| A61F 13/84 | (2006.01) |
| A61L 2/06 | (2006.01) |
| A61L 15/22 | (2006.01) |
| A61L 15/44 | (2006.01) |
| A61L 15/60 | (2006.01) |
| B01J 20/26 | (2006.01) |
| B09B 3/32 | (2022.01) |
| B09B 3/35 | (2022.01) |
| B09B 3/70 | (2022.01) |
| B29B 17/02 | (2006.01) |
| B29B 17/04 | (2006.01) |
| C08J 11/06 | (2006.01) |
| B09B 101/67 | (2022.01) |
| B29B 17/00 | (2006.01) |
| B29K 1/00 | (2006.01) |
| B29L 31/48 | (2006.01) |

(52) U.S. Cl.
CPC ............... *A61L 11/00* (2013.01); *A61F 13/84* (2013.01); *A61L 2/06* (2013.01); *A61L 15/225* (2013.01); *A61L 15/44* (2013.01); *A61L 15/60* (2013.01); *B01J 20/26* (2013.01); *B09B 3/32* (2022.01); *B09B 3/35* (2022.01); *B09B 3/70* (2022.01); *B29B 17/02* (2013.01); *B29B 17/0412* (2013.01); *C08J 11/06* (2013.01); *A61F 2013/8402* (2013.01); *B09B 2101/67* (2022.01); *B29B 2017/001* (2013.01); *B29B 2017/0231* (2013.01); *B29K 2001/00* (2013.01); *B29L 2031/4878* (2013.01); *C08J 2301/02* (2013.01)

(58) Field of Classification Search
None
See application file for complete search history.

(56) References Cited

U.S. PATENT DOCUMENTS

| | | |
|---|---|---|
| 7,306,697 B2 | 12/2007 | Kikushima |
| 2012/0056021 A1 | 3/2012 | Grimes |
| 2019/0224886 A1 | 7/2019 | Somma |

FOREIGN PATENT DOCUMENTS

| | | | |
|---|---|---|---|
| AU | 2011381567 B2 | 12/2016 | |
| CN | 1830259 A | * 9/2006 | |
| CN | 107583932 A | 1/2018 | |
| CN | 108902145 A | * 11/2018 | ............. A01N 25/02 |
| JP | H06313008 A | 11/1994 | |
| JP | 2001047023 A | 2/2001 | |

(Continued)

OTHER PUBLICATIONS

English translation of CN107583932 (Year: 2018).*
International Search Report and Written Opinion dated Sep. 17, 2020. 12 pages.

*Primary Examiner* — Tanisha Diggs
(74) *Attorney, Agent, or Firm* — Daniel S. Albrecht (57) ABSTRACT

A method for sterilizing and decontaminating post-consumer absorbent products polluted with organic compounds derived from human metabolism including drug residues, the post-consumer absorbent sanitary products comprising fractions of plastic, super-absorbent polymers (SAP), and optionally cellulose, the method including at least the steps of: sterilizing (SR) the absorbent sanitary post-consumer products by heating to a temperature equal to or less than 140° C., and to a pressure lower than 4 bar, decontaminating (DC) the post-consumer absorbent sanitary products of organic compounds by treating with an oxidizing composition comprising at least one compound selected from the group consisting of hydrogen peroxide, sodium percarbonate, potassium percarbonate, sodium perborate, potassium perborate, potassium monopersulfate, ammonium persulfate, sodium persulfate, potassium persulfate, and ozone. The at least one compound is contained in the oxidizing composition in an amount equal to or greater than 2% by weight with respect to the dry weight of the post-consumer absorbent sanitary products.

15 Claims, 4 Drawing Sheets

(56) References Cited

FOREIGN PATENT DOCUMENTS

| | | | | |
|---|---|---|---|---|
| JP | 2001310178 | A | * | 11/2001 |
| JP | 2018080345 | A | | 5/2018 |
| WO | 2013077877 | A1 | | 5/2013 |
| WO | 2018060827 | A1 | | 4/2018 |
| WO | 2019087485 | A1 | | 5/2019 |

* cited by examiner

Figure 8

METHOD FOR STERILIZING AND DECONTAMINATING POST-CONSUMER ABSORBENT SANITARY PRODUCTS POLLUTED WITH ORGANIC COMPOUNDS DERIVED FROM HUMAN METABOLISM

CROSS-REFERENCE TO RELATED APPLICATIONS

This application is a 371 National Stage of International Application No. PCT/IB2020/054771, filed May 20, 2020, which claims priority to Italian Patent Application No. 102019000010062 filed Jun. 25, 2019. The disclosure of each of the above applications is incorporated herein by reference in its entirety.

FIELD OF THE INVENTION

The present description relates to recycling post-consumer absorbent sanitary products. In particular, the present description relates to methods for sterilizing and decontaminating post-consumer absorbent sanitary products for people (AHP) polluted with organic compounds deriving from human metabolism.

BACKGROUND OF THE INVENTION

Absorbent sanitary products for people are generally composed of different materials, including, for example, plastic film, cellulose fluff, superabsorbent polymers (SAP), and breathable sheets made of synthetic fibrous material. These sanitary products, therefore, contain valuable materials whose recovery for re-use on the market is a decidedly desirable goal.

Critical issues related to treating post-consumer absorbent sanitary products not only relate to the presence of organic excretions and bacterial contaminations, but also to the presence of post-metabolic chemical compounds that derive from drugs used by the user for specific therapeutic treatments.

Post-consumer absorbent sanitary products must, therefore, not only be sterilized but also decontaminated from the chemical point of view, to be subsequently recycled and marketed as recovered raw materials (and not as waste).

Exposure of post-consumer absorbent sanitary products to a sterilization temperature, however, may be insufficient for also obtaining decontamination of post-metabolic organic residues, for example, derived from drugs.

On the other hand, methods that require subjecting post-consumer absorbent sanitary products to heating steps at very high temperatures and pressures may present significant problems.

Methods are known, to date, for example, described in the document EP 3 162 455 B1, which envisage treating post-consumer absorbent sanitary products at a temperature of at least 200° C., and at a pressure above 20 bar. These temperature and pressure regimes, however, although also potentially effective from the point of view of decontamination of post-metabolic chemical residues, can be decidedly aggressive for the mixed material subjected to the treatment. In particular, the cellulose-based component (a carbohydrate composed of glucose units) undergoes browning above 140° C., caramelization above 160° C., and depolymerization above 200° C., with a consequent reduction in softness and absorbent capacity, while the plastic begins to soften above 160° C., until it melts, incorporating the other materials, and consequently losing the intrinsic mechanical properties. As a result, the yield and quality of the recycled material may be compromised.

OBJECT AND SUMMARY OF THE INVENTION

The present description aims to provide a method for treating post-consumer absorbent sanitary products that allows obtaining sterilization and decontamination of organic compounds derived from human metabolism, for example, drug residues, at the same time preserving the quality of products recovered from the post-consumer material for convenient reuse or recycling in the market.

The post-consumer absorbent sanitary products to be subjected to the method of the present description can include, for example, diapers for babies, incontinence pads for adults, sanitary towels, bed linings, etc. These absorbent products can comprise plastic, super-absorbent polymers, cellulose, or even only plastic and super-absorbent polymers.

According to the present description, this object is achieved thanks to a method having the characteristics forming the subject of the attached claims. The claims form an integral part of the disclosure provided here in relation to the described method.

An embodiment of the present description provides a method for sterilizing and decontaminating post-consumer absorbent sanitary products polluted with organic compounds, said post-consumer absorbent sanitary products comprising the fractions of plastic, super-absorbent polymers (SAP), and—optionally—cellulose, the method comprising at least the steps of:

sterilizing said post-consumer absorbent sanitary products by heating to a temperature equal to or lower than 140° C. and at a pressure lower than 4 bar, decontaminating said post-consumer absorbent sanitary products of organic compounds by means of treatment with an oxidizing composition comprising at least one compound selected in the group consisting of hydrogen peroxide, sodium percarbonate, potassium percarbonate, sodium perborate, potassium perborate, potassium monopersulfate, ammonium persulfate, sodium persulfate, potassium persulfate, ozone.

In one or more embodiments, treatment with the oxidizing composition involves contacting said post-consumer absorbent sanitary products with this composition.

In one or more embodiments, the oxidizing composition is an aqueous solution comprising at least one compound selected in the group consisting of hydrogen peroxide, sodium percarbonate, potassium percarbonate, sodium perborate, potassium perborate, potassium monopersulfate, ammonium persulfate, sodium persulfate, potassium persulfate, ozone.

The method may also comprise at least one of the steps of—shredding said post-consumer absorbent sanitary products, and obtaining shredded post-consumer sanitary products; drying said shredded post-consumer absorbent sanitary products, and obtaining said shredded and dried post-consumer absorbent sanitary products comprising plastic, super-absorbent polymers (SAP) and optionally cellulose; separating plastic, super-absorbent polymers (SAP) and optionally cellulose from said shredded and dried post-consumer absorbent sanitary products.

The decontamination step can be carried out by treating the post-consumer absorbent sanitary products with the oxidizing composition simultaneously with the sterilization step.

In one or more embodiments, the decontamination step can be carried out by treating the sterilized products with the oxidizing composition simultaneously with the shredding step and/or by treating the sterilized and shredded products with said oxidizing composition simultaneously with said drying step.

In one or more embodiments, the decontamination step is carried out by treating said plastic and/or cellulose with the oxidizing composition.

In one or more embodiments, the sterilization step of the post-consumer absorbent sanitary products is carried out at a temperature between 120° C. and 140° C. and at a pressure between 1 bar and 3.6 bar.

The method described in the present description favors the obtainment of the cellulose, plastic and super-absorbent polymer (SAP) components recovered from sterilized and decontaminated post-consumer absorbent sanitary products polluted with organic compounds, with characteristics that make them suitable for recycling or reuse.

In one or more embodiments, the present description relates to plastic, super-absorbent polymers (SAP) and cellulose derived from post-consumer absorbent sanitary products polluted with organic compounds, such as, for example, post-metabolic residues derived from drugs, obtained with the method described.

The at least one oxidizing compound can be used in an amount equal to or greater than 2% by weight with respect to the dry weight of the post-consumer absorbent sanitary products.

The oxidizing composition may comprise hydrogen peroxide in an amount greater than 5% by weight, preferably greater than 10% by weight, more preferably between 10% and 90% by weight with respect to the dry weight of said post-consumer absorbent sanitary products.

The dry weight of the post-consumer absorbent sanitary products is determined according to the official UNI 936 UNICHIM 10506/1996 method.

In one or more embodiments, the oxidizing composition comprises hydrogen peroxide and potassium monopersulfate, preferably in a weight ratio between 3:1 and 20:1, preferably between 5:1 and 18:1.

BRIEF DESCRIPTION OF THE DRAWINGS

The method will now be described in detail with reference to the attached drawings, given purely by way of non-limiting example, wherein.

DETAILED DESCRIPTION

In the following description, numerous specific details are provided to allow a thorough understanding of embodiments. The embodiments can be put into practice without one or more of the specific details or with other methods, components, materials etc. In other cases, well-known structures, materials or operations are not shown or described in detail to avoid confusing aspects of the embodiments.

Reference throughout the present disclosure to "one embodiment" or "an embodiment" indicates that a particular aspect, structure or characteristic described with reference to the embodiment is included in at least one embodiment. Thus, forms of the expressions "in one embodiment" or "in an embodiment" at various points throughout the present description are not necessarily all referring to the same embodiment. Moreover, the particular aspects, structures or characteristics can be combined in any convenient way in one or more embodiments. The titles provided in this description are for convenience only and do not interpret the scope or object of the embodiments.

As anticipated in the previous sections, sterilization methods of post-consumer absorbent sanitary products may not guarantee decontamination of organic residues of a post-metabolic nature, for example, derived from drugs, from the treated material.

The Inventors of the present application have identified specific operating conditions of a method capable of promoting sterilization and—at the same time—decontamination of organic compounds from post-consumer absorbent sanitary products without the need to resort to operating conditions (e.g. heating steps at a temperature above 200° C. and a pressure above 20 bar) that could affect the quality of the separate components recovered from these post-consumer absorbent products, such as, for example, cellulose, plastic, and super-absorbent polymers (SAP).

In particular, the method of the present description is a method for sterilizing and decontaminating post-consumer absorbent sanitary products polluted with organic compounds derived from the human metabolism comprising drug residues, said post-consumer absorbent sanitary products containing the fractions of plastic, super-absorbent polymers (SAP), and—optionally—cellulose, the method comprising at least the steps of:

sterilizing said post-consumer absorbent sanitary products by heating to a temperature equal to or lower than 140° C. and treatment at a pressure lower than 4 bar, decontaminating said post-consumer absorbent sanitary products of organic compounds derived from human metabolism comprising drug residues, by treating with an oxidizing composition comprising at least one compound selected from the group consisting of hydrogen peroxide, sodium percarbonate, potassium percarbonate, sodium perborate, potassium perborate, potassium monopersulfate, ammonium persulfate, sodium persulfate, potassium persulfate, ozone.

In one or more embodiments, the oxidizing composition is an aqueous solution comprising the at least one compound selected from the group consisting of hydrogen peroxide, sodium percarbonate, potassium percarbonate, sodium perborate, potassium perborate, potassium monopersulfate, ammonium persulfate, sodium persulfate, potassium persulfate, ozone.

The expression "absorbent sanitary products" generally refers to disposable absorbent products, such as diapers for babies, incontinence pads for adults, sanitary towels, bed linings, etc. These absorbent products may comprise plastic, super-absorbent polymers, cellulose or even plastic and super-absorbent polymers only.

In one or more embodiments, treatment in the decontamination step involves contacting the post-consumer absorbent sanitary products with the oxidizing composition.

In one or more embodiments, the sterilization step is carried out by heating the post-consumer absorbent sanitary products to a temperature between 120° C. and 140° C., and treatment at a pressure between 1 bar and 3.6 bar.

The time interval for conducting the sterilization step can be comprised between 20 minutes and 2 hours.

In one or more embodiments, the at least one oxidizing compound can be present in the oxidizing composition in an amount equal to or greater than 2% with respect to the dry weight of the post-consumer absorbent sanitary products.

The dry weight of the post-consumer absorbent sanitary products is determined according to the official UNI 936 UNICHIM 10506/1996 method.

In one or more embodiments, the oxidizing composition may comprise at least one compound selected from hydrogen peroxide and potassium monopersulfate.

In one or more embodiments, the composition may comprise hydrogen peroxide in an amount greater than 5% by weight, preferably greater than 10% by weight, more preferably between 20% and 90% by weight with respect to the dry weight of said post-consumer absorbent sanitary products to be treated.

In one or more embodiments, the composition may comprise hydrogen peroxide as the only oxidizing compound, preferably in an amount greater than 5% by weight, preferably greater than 10% by weight, more preferably between 10% and 90% by weight with respect to the dry weight of said post-consumer absorbent sanitary products to be treated.

In one or more embodiments, the composition comprises potassium monopersulfate, preferably in an amount greater than 2% by weight, preferably greater than 10% by weight with respect to the dry weight of the post-consumer absorbent sanitary products to be treated.

In one or more embodiments, the composition may comprise hydrogen peroxide and potassium monopersulfate. The composition may comprise hydrogen peroxide in an amount greater than 5% by weight and potassium monopersulfate in an amount greater than 2% by weight with respect to the dry weight of the post-consumer absorbent sanitary products to be treated.

In one or more embodiments, the oxidizing composition comprises hydrogen peroxide and potassium monopersulfate, in a weight ratio between 3:1 and 20:1, preferably between 5:1 and 18:1.

In one or more embodiments, the oxidizing composition consists of hydrogen peroxide and potassium monopersulfate, in a weight ratio between 3:1 and 20:1, preferably between 5:1 and 18:1.

In one or more embodiments, oxidizing compounds preferably excluded from the composition are sodium hypochlorite, potassium dichromate, chlorine, fluorine, and potassium permanganate.

Particularly advantageous results were observed when the post-consumer absorbent sanitary products were treated with the oxidizing composition at a temperature above 50° C.

Figure 1:
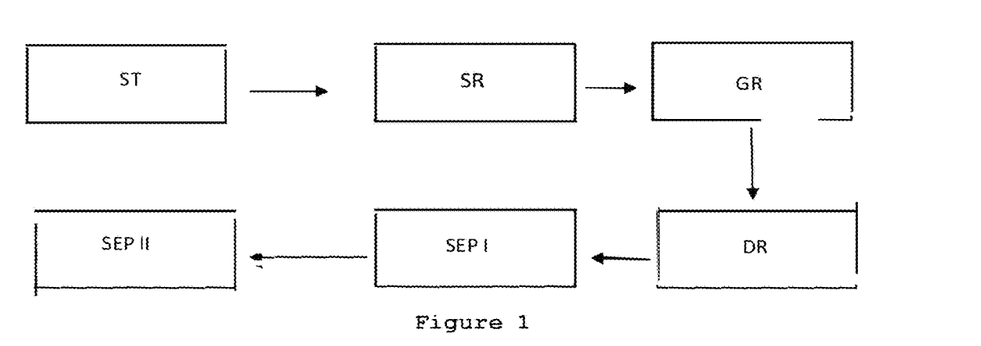
FIG. 1 represents a diagram of a method of sterilizing and separating plastic, super-absorbent polymers (SAP) and cellulose from post-consumer absorbent sanitary products.

The method subject of the present description allows products recovered from post-consumer material to be obtained—cellulose, plastic and super-absorbent polymers (SAP)—in which the quality is preserved for convenient re-use on the market. As schematically illustrated, for example, in FIG. 1, the method may comprise the steps of shredding SH the post-consumer absorbent sanitary products, drying the shredded products DR, separating SEP I the shredded and dried products into plastic and cellulose, and separating SEP II the cellulose into super-absorbent polymers (SAP) and cellulose fluff as, for example, described in document WO 2018/060827 of the same Applicant.

Figure 2:
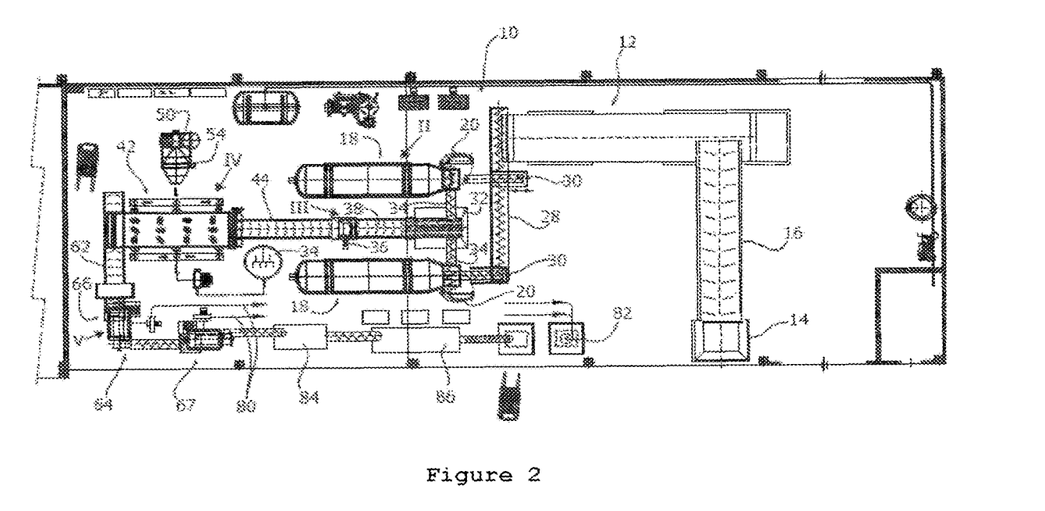
FIG. 2 is a plan view of an apparatus usable for the method schematized in FIG. 1.

In particular, the method may comprise a collection step ST of the post-consumer absorbent sanitary products coming from the recycling collection in a storage container. FIG. 2 illustrates an apparatus 10 wherein the storage container is indicated by reference number 12. Waste collection vehicles unload post-consumer absorbent sanitary products into a unloading area 14 and a conveyor 16 loads the post-consumer absorbent sanitary products into the storage container 12.

Collected post-consumer absorbent sanitary products may have a density in the order of 150-300 kg/m$^3$ and humidity in the order of 65-80%.

The total humidity of the material, understood as the percentage of water contained therein, is calculated from the dry weight of the sample (according to methods IRSA-CNR 1984—notebook 64 and UNI 936 UNICHIM 10506/1996).

After the collecting step ST, the sterilization step SR follows, for example, carried out by loading the products in a rotary autoclave 18.

In the example illustrated in FIG. 2, the apparatus 10 comprises two autoclaves 18, which are loaded alternately with post-consumer absorbent sanitary products coming from the storage container 12. A conveyor 28 picks up the products from the storage container 12 and transports them to the autoclaves 18. Two loaders 30 load the products within the respective autoclaves 18. During loading of the products, the door 20 of the autoclaves is opened, and the cylindrical body is rotated to progressively shift the products towards the rear part. Once loading has finished, the door 20 is closed and the autoclave 18 is heated and pressurized by direct and indirect supply of steam, until it reaches a temperature of about 135° C. and an internal pressure of about 3.1 bar.

During the sterilization treatment, the autoclave can be alternatively activated in a clockwise and anticlockwise rotation around its axis in order to allow the movement of the products contained therein.

The sterilization step SR has the object of bringing the temperature of the products to above 121° C., or rather, to a temperature at which it is possible to obtain complete sterilization of the bacterial load. The sterilization step can be carried out for a time interval from 20 minutes to 2 hours.

At the end of the sterilization treatment, the vapor contained within the autoclave 18 is extracted and purified in a scrubber 34. The door 20 is then opened and the body is rotated to unload the products. In the example of FIG. 2 two autoclaves 18 are provided, which operate in an alternating manner. While the first autoclave 18 performs the sterilization treatment, the other autoclave 18 performs the operations of unloading sterilized material and loading of a new batch. In this way, it is possible to obtain an essentially continuous stream of sterilized material downstream of the autoclaves 18.

At the end of the sterilization treatment, the sterilized material leaving the autoclave is collected in a storage container 32. The sterilized material leaving the autoclave may have a density of about 300-400 kg/m$^3$, a temperature of 80-100° C. and a total humidity in the order of 70-85%.

From the storage container 32, the sterilized material is sent to a shredder 36 by means of a conveyor belt 38. The shredder may comprise, for example, two rotors driven by a motor. The rotors are provided with teeth that carry out shredding of the material. The shredding allows shredded material to be obtained having a particle size of less than 10 cm, preferably less than 3 cm, more preferably less than 1 cm. After the shredding SH, the material may present a density in the order of 400-500 kg/m$^3$, a temperature of about 75-95° C. and a total humidity in the order of 70-85%.

The material subjected to the sterilization and shredding steps is sent by means of a conveyor 44 to a dryer 42, where the drying step DR is carried out. The dryer 42 comprises a casing within which horizontal perforated conveyors are housed, driven alternately in opposite directions and superimposed vertically. The conveyor 44 unloads the material onto the upper conveyor. At the outlet of each horizontal conveyor, the material falls onto the underlying conveyor. While the material is transported horizontally and passes sequentially from one conveyor to the underlying one, a flow of heated air passes through the casing from the bottom upwards. The flow of air passes through the perforated conveyors and the material located on them. The airflow is generated by a fan 50 connected to a filter. The airflow is heated in a battery of heat exchangers 54 supplied with steam. The airflow leaving the heat exchanger 42 is aspirated by a second fan and is sent to a condensation discharge device 58 to a scrubber. At the outlet of the dryer, the material is unloaded onto a conveyor belt. The dryer 42 can be equipped with microwave generators facing the upper conveyor, to accelerate heating of the material and increase the drying effect. The material at the inlet of the dryer has a temperature of about 70-90° C. The temperature of the drying air inside the dryer 42 is about 140° C. The product at the outlet of the dryer 42 has a temperature of about 50-70° C., a density of about 35-50 kg/m$^3$ and a total humidity of about 5-20%.

Downstream of the drying step DR, the sterilized, shredded and dried material is sent to a separation assembly 64 in which the step of separating plastic and cellulose is performed (SEP I). The separation assembly 64 may comprise at least one first centrifugal separator comprising a base and having an inlet for the material to be separated. In the example illustrated in FIG. 2, two centrifugal separators 66, 67 are provided in cascade.

The centrifugal separator 66 may comprise a separation chamber 72 in which a perforated cylindrical filter is housed, within which a rotor is mounted, rotatable about a horizontal axis. The inlet material is projected radially outwards against the perforated filter. The cellulose has smaller dimensions than the plastic, and passes through the filter and is collected in a first outlet, while the plastic remains inside with respect to the filter and is collected in a second outlet. Preferably, the plastic leaving the first centrifugal separator 66 is sent to a second centrifugal separator 67 having a smaller perforation filter. At the outlet of the first centrifugal separator, cellulose is obtained with a purity in the order of 85-95% and plastic with a purity in the order of 60-80%. At the outlet of the second centrifugal separator, cellulose is obtained with a purity in the order of 85-95% and plastic with a purity in the order of 85-97%.

With reference to FIG. 2, at the outlet of the centrifugal separators 66, the cellulose flows 80 can be sent to a cellulose shredder and to a cellulose pelletizer 82. Alternatively, cellulose flows can be sent to an additional separator apparatus for another separation step SEP II for separating cellulose and super absorbent polymers (SAP), to obtain cellulose with a high degree of purity.

The plastic leaving the separator 66 can be sent to a plastic shredder 84 and subsequently to an extruder or densifier 86.

The step of eliminating chemical compounds, for example, derived from drugs by treatment with the oxidizing composition described in the present application can be carried out in different steps of the described method, as schematically illustrated in FIGS. 3 to 6, in order to obtain the recovery of the different components, such as sterilized and decontaminated plastic, cellulose and super-absorbent polymers.

Figure 3:
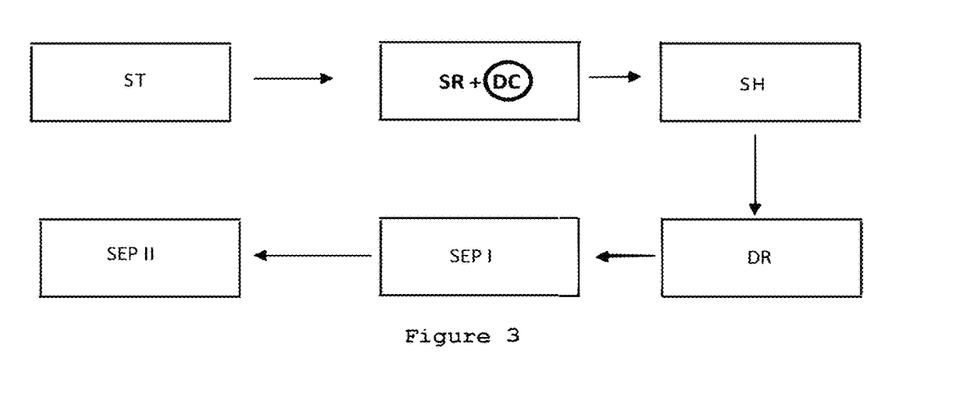
FIG. 3 represents a diagram of a method according to an embodiment of the present description in which a decontamination step of chemical compounds is carried out simultaneously with the sterilization step.

In one or more embodiments as, for example, illustrated in FIG. 3, the decontamination step of organic compounds DC can be carried out simultaneously with the sterilization step (SR+DC). In this case, the oxidizing composition as defined in the present description is added to the load of post-consumer sanitary products to be sterilized, preferably in a rotary autoclave (for example, as described in the previous sections) in order to allow movement and mixing of products through rotation. The oxidizing composition can be sprayed on the material placed in the autoclave, for example by suction.

Absorbent sanitary products are heated to a temperature of between 120° C. and 140° C. and an internal pressure of between 1 bar and 3.6 bar.

The temperature of the post-consumer absorbent sanitary products subjected to sterilization and treatment with the oxidizing composition may vary, during the sterilization step, from 30° C. to 130° C.

The time interval for conducting the sterilization and decontaminating step can be between 20 minutes and 2 hours.

The post-consumer absorbent sanitary products subjected to sterilization and—at the same time—to treatment with the oxidizing composition may have a humidity value between 70% and 85%.

The oxidizing composition that can be used can, for example, comprise potassium monopersulfate dissolved in an aqueous solution in an amount equal to or greater than 5% by weight (for example, 10% or 15%) with respect to the dry weight of the post-consumer absorbent sanitary products.

In one or more embodiments, the composition is a solution of potassium monopersulfate used in an amount equal to or greater than 5% (for example, 10% or 15%) by weight with respect to the dry weight of the post-consumer absorbent sanitary products.

Figure 4:
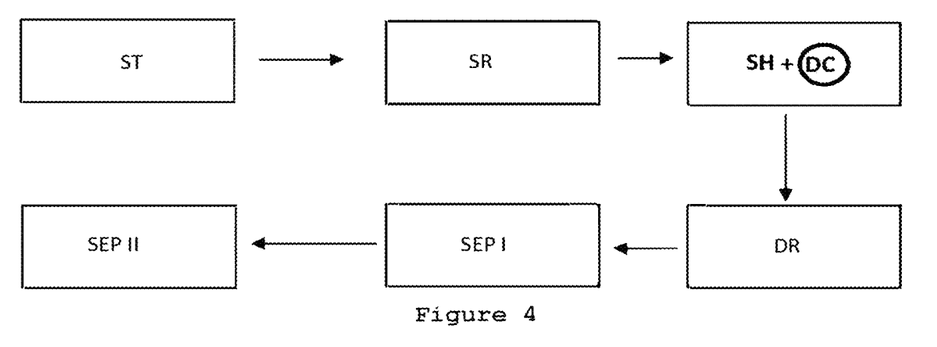
FIG. 4 represents a diagram of a method according to an embodiment of the present description in which the decontamination step of chemical compounds is carried out simultaneously with the shredding step.

FIG. 4 illustrates an embodiment in which the decontamination step DC is carried out downstream of the sterilization step, instead of simultaneously with the sterilization step SR, or rather, simultaneously with the shredding step SH (SH+DC). In this case, the oxidizing composition subject of the present description can be added directly into the shredder in which the sterilized material is present, for example, by spraying. Spraying can be carried out with nozzles in series fed with a piston pump that delivers 5 L/minute of the oxidizing composition at 7 bar.

The products are shredded to generate a final particle size of less than 10 cm, preferably less than 3 cm, even more preferably less than 1 cm. The shredded products are mixed with screw conveyors. Sanitary products subjected to shredding and treatment with the oxidizing composition can have an average temperature between 75-95° C. and a total humidity between 70-85%.

The step of shredding and treating with the oxidizing composition can be carried out in a time interval of between 30 minutes and 120 minutes.

The oxidizing composition can, for example, comprise hydrogen peroxide in combination with potassium monopersulfate in a weight ratio comprised between 5:1 and 18:1. For example, the composition may comprise an amount of hydrogen peroxide and potassium monopersulfate—respectively—of 89% and 5% with respect to the dry weight of the post-consumer absorbent sanitary products.

Figure 5:
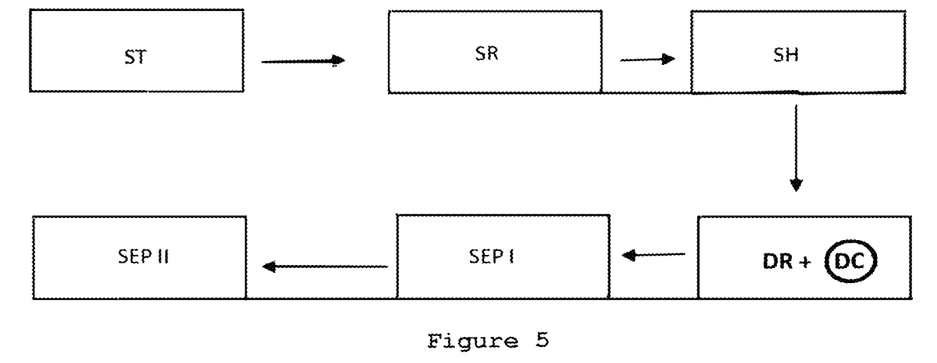
FIG. 5 represents a diagram of a method according to an embodiment of the present description in which the decontamination step of chemical compounds is carried out simultaneously with the drying step.

FIG. 5 illustrates an example of an embodiment in which the decontamination step DC is carried out in conjunction with the drying step DR (DC+DR). In this case, for example, the oxidizing composition subject of the present description can comprise hydrogen peroxide and potassium monopersulfate in a weight ratio from 5:1 to 18:1 (for example, in an amount, respectively, of 26% and 5% by weight with respect to the weight of the dry material). In order to produce such a composition, 33% v/v hydrogen peroxide can be used in water in which the potassium monopersulfate is dissolved.

The oxidizing composition can be distributed on shredded and dried post-consumer absorbent sanitary products by spraying in order to soak the material derived from the shredder. Spraying can be carried out by means of nozzles in series fed with a piston pump which delivers 4 L/minute of the oxidizing composition at 7 bar.

The total humidity of the material subjected to drying and treatment with the oxidizing composition can vary between an average value from 70% to 85% when the material enters the dryer, and an average value from 5% to 20% at the end of the drying step, when the material leaves the dryer.

Sanitary products subjected to drying and simultaneous treatment with the oxidizing composition may have an average temperature of 50-90° C.

The step of drying and treating with the oxidizing composition can be carried out in a time interval of about 2 hours.

Figure 6:
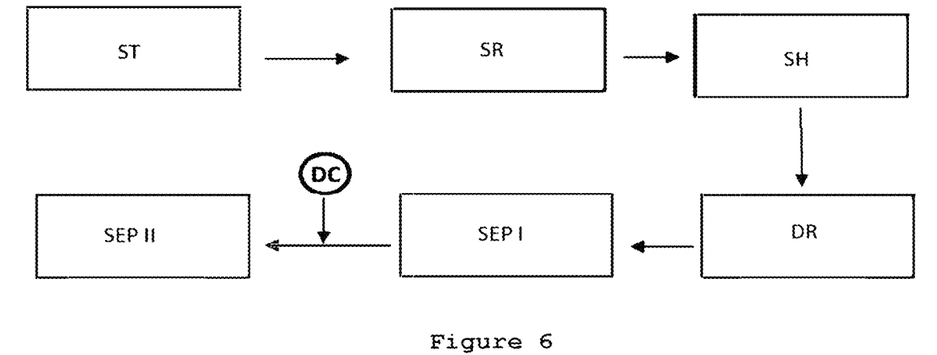
FIG. 6 represents a diagram of a method according to another embodiment of the present description in which the decontamination step of chemical compounds is carried out downstream of the drying step.

FIG. 6 illustrates an example of an additional embodiment in which decontamination DC is carried out downstream of the DR drying step, for example, downstream of the cellulose and plastic separation step SEP I. In this case, the oxidizing composition can be used to treat the individual separate components. In one or more embodiments, the oxidizing composition is placed directly in contact with the cellulose and/or plastic derived from the separation step.

In one or more embodiments, the oxidizing composition comprises the at least one compound in an amount equal to or greater than 2% by weight with respect to the dry weight of said plastic and/or said cellulose separated from said shredded and dried post-consumer absorbent sanitary products.

In one or more embodiments, the oxidizing composition comprises hydrogen peroxide in an amount greater than 5% by weight, preferably greater than 10% by weight, more preferably between 10% and 90% by weight with respect to the dry weight of said plastic and/or said cellulose separated from said shredded and dried post-consumer absorbent sanitary products.

In one or more embodiments, the composition may comprise hydrogen peroxide and potassium monopersulfate. The composition may comprise hydrogen peroxide in an amount greater than 5% by weight and potassium monopersulfate in an amount greater than 2% by weight with respect to the dry weight of said plastic and/or of said cellulose separated from said shredded and dried post-consumer absorbent sanitary products.

In one or more embodiments, the oxidizing composition comprises hydrogen peroxide and potassium monopersulfate, in a weight ratio between 3:1 and 20:1, preferably between 5:1 and 18:1.

The oxidizing composition can be applied to the plastic and/or cellulose contained in an oxidative treatment unit, for example, a chemical reactor, through a nozzle. Distribution of the composition can take place by mixing with a blade or screw or by rotation of the reaction chamber.

The material (plastic and/or cellulose) subjected to treatment with the oxidizing composition is heated to a temperature from 30° C. to 120° C., preferably between 50° C. and 110° C. and treated at a pressure from −1 bar to 2 bar, preferably between 1 bar and 2 bars.

The time that the material (plastic and/or cellulose) stays in the reactor is between 2 hours and 3 hours. The total humidity of the material can be between 5% and 25%.

In this case, the oxidizing composition can, for example, comprise hydrogen peroxide in an amount greater than 5%, for example, equal to 26% by weight with respect to the dry weight of the plastic and/or cellulose. The oxidizing composition can be obtained by diluting hydrogen peroxide to 30% (w/w) in water or to 50% (w/w) in water. The composition may further comprise ozone in an amount comprised between 1% and 10% by weight (w/w) with respect to the dry weight of the plastic and/or cellulose.

The method described in the present description favors the sterilization of post-consumer absorbent sanitary products and also decontamination of organic compounds by more than 99% as a reduction of possible quantities of organic residues of a post-metabolic nature also deriving from the use of drugs.

The method described here, therefore, allows recycling and marketing of sanitary products treated as recovered raw materials (and not as waste).

EXAMPLES

The following description relates to experimental tests conducted by the Inventors of this application in order to:
i) verify the extent of pollution by chemical compounds of post-consumer absorbent sanitary products subjected to sterilization,
ii) test the effectiveness of specific oxidizing compositions in obtaining decontamination of residual chemical compounds in the treated post-consumer absorbent sanitary products. The following results demonstrate that a decontamination step carried out by treating post-consumer absorbent sanitary products with specific compositions of oxidants allows the significant reduction of residual organic compounds, even at levels above 99%.

Chemical Pollution of Post-Consumer Sanitary Products Subjected to Sterilization The inventors of this application conducted a series of experimental tests in which the following material samples were tested:
i) post-consumer absorbent sanitary products recovered, but not treated with preliminary pollution,
ii) post-consumer absorbent sanitary products in which "polluting" chemical compounds have been added at a concentration of 580 µg/kg$_{ss}$, micrograms per kg of dry material (spiked samples, or rather fortified), and iii) post-consumer cellulose recovered during the separation step, in which "polluting" chemical compounds have been added at a concentration of 1000 µg/kg$_{ss}$, micrograms per kg of dry material (overspiked samples).

Polluting chemical compounds were added to the sanitary products to obtain two distinct quantities of 580 and 1000 µg/kg$_{ss}$, micrograms per kg of dry material. The dry weight of the material was determined according to the official method 936 UNICHIM 10506/1994. The quantity equal to 580 µg/kg$_{ss}$ is the quantity potentially found in post-consumer (non-fortified) absorbent sanitary products, whose users have all taken all the drugs chosen as indicators at the maximum dose. The quantity of 580 µg/kg$_{ss}$ derives from an estimate derived from a study that considered doses of drugs and pharmacokinetics as the only considerable parameters. The quantity of 1000 µg/kg$_{ss}$ is consequently an overestimate useful to better test the efficiency of the decontamination process.

The polluting chemical compounds used to obtain the fortified samples are listed in Table 1 below.

TABLE 1

Chemical compounds

| | |
|---|---|
| 1 | Benzethonium chloride |
| 2 | Betamethasone acetate |
| 3 | Hydrocortisone |
| 4 | Oxybutynin |
| 5 | Ibuprofen |
| 6 | Ampicillin |
| 7 | Bisoprolol |
| 8 | Diazepam |
| 9 | Telmisartan |
| 10 | Cefaclor |
| 11 | Trimethoprim |
| 12 | Allopurinol |
| 13 | Metoprolol Tartrate |
| 14 | Metformin |
| 15 | Ciprofloxacin |
| 16 | Atenolol |
| 17 | Levofloxacin |
| 18 | Nebivolol |
| 19 | 5-fluorouracil |
| 20 | Azithromycin |
| 21 | Lovastatin |
| 22 | Bicalutamide |
| 23 | Atorvastatin |
| 24 | Tetracycline |
| 25 | Lansoprazole |
| 26 | Clarithromycin |
| 27 | Clavulanic acid |
| 28 | Clopidogrel |
| 29 | Sulfamethoxazole |
| 30 | Torasemide |
| 31 | Cefepime |
| 32 | Hydrochlorothiazide |
| 33 | Tolterodine |
| 34 | Acetylsalicylic acid |
| 35 | Loperamide |
| 36 | Naproxen |
| 37 | Diclofenac sodium |
| 38 | Cefazolin |
| 39 | Pioglitazone |
| 40 | Estriol |
| 41 | Amoxicillin |
| 42 | Paracetamol |
| 43 | Chloramphenicol |

The polluting chemical compounds listed in Table 1 are compounds selected as indicators of the efficiency of the process among all the drugs relevant to the type of absorbent sanitary product user, also by drawing on databases of the AIFA (Italian Drug Agency) or of the ASL (Local Health Authorities).

The material samples referred to in points i), ii), and iii) were subjected to autoclave sterilization at a temperature of 135° C. and an inner pressure of 3.1 bar, for a period of 20 minutes.

The analytical evaluation of the decontamination degree of the treated samples was carried out by means of a transfer test (leaching) which allowed obtainment of an analyzable solution from the solid matrix. To this end, in the absence of relevant legislation, the indications suggested by the general methods EN12457 (parts 1-2-3-4) and EPA 3500C were followed in order to identify the most suitable conditions for the particular absorbent nature of the material. The following basic conditions were used:

1. extracting step: water/methanol, 1:1 v/v;
2. liquid/solid ratio, L/S, equal to 10 L/Kg;
3. liquid-solid contact time: 24 h soaking;
4. number of extractions equal to at least 3.

The derived solution was analyzed by liquid chromatography coupled with a mass spectrometry detector.

The chemical-analytical feedback on the tested samples showed that a sterilization method carried out in an autoclave at a temperature of 135° C. and an inner pressure of 3.1 bar causes a partial decontamination effectiveness from chemical compounds, and therefore not satisfactory, as described below.

In particular, samples of non-fortified post-consumer absorbent sanitary products, downstream of the autoclave method, still have residues of primary and/or secondary metabolites related to the use of drugs taken by the user of the sanitary products in question, for treating certain pathologies.

In fortified samples, or rather in post-consumer absorbent sanitary products in which "pollutants" were added, the effectiveness of chemical decontamination of the sterilization method alone was not greater than 18%.

Having verified the extent of pollution by chemical compounds of post-consumer absorbent sanitary products subjected to sterilization, the Inventors tested the effectiveness of specific oxidizing compositions in obtaining decontamination of residual chemical compounds in post-consumer absorbent sanitary products.

Selection Criteria of Specific Oxidizing Compositions for Obtaining Chemical Decontamination Table 2 lists some of the compounds known as "strong chemical oxidants" and which have been considered suitable for the oxidative decontamination of the compounds reported in Table 1. Table 2 also reports the values of the standard potentials E°, expressed in volts, V, for the oxidizing compounds listed.

TABLE 2

| Chemical species | Standard potential E° V |
|---|---|
| Fluorine (g) | 2.87 |
| Ozone (g) | 2.10 |
| Persulfates (s) of K (KPS), Na$^+$ or NH$_4^+$ | 2.01 |
| Monopersulfate of K (MPS) 2KHSO$_5$•KHSO$_4$•K$_2$SO$_4$ (s) | 1.85 |
| Hydrogen peroxide: H$_2$O$_2$ (l) | 1.76 |
| Sodium (o potassium) percarbonate: Na$_2$CO$_3$•1.5H$_2$O$_2$ (s) K$_2$CO$_3$•1.5H$_2$O$_2$ (s) | |
| Sodium (o potassium) perborate: | |

TABLE 2-continued

| Chemical species | Standard potential E° V |
|---|---|
| NaBO$_2$•H$_2$O$_2$ (s) | |
| 2(KBO$_2$•H$_2$O$_2$) (s) | |
| Potassium permanganate (s) | 1.5 |
| Chlorine (g) | 1.4 |
| Potassium dichromate (s) | 1.3 |
| Sodium hypochlorite (s) | 0.9 |

(s) solid, (l) liquid or (g) gaseous

Having defined the target to be oxidized (i.e. the chemical compounds listed in Table 1), the Inventors evaluated the intrinsic tendency to be oxidized for each compound, as well as its resistance to the oxidation reaction. From a thermodynamic point of view, the ease with which an oxidation reaction proceeds between two species with different potential standards E°, depends exponentially on the difference between the potentials of the two species involved. The higher the difference, the more the reaction is favored. The inventors of the present application have therefore assessed, upstream, the oxidation potentials of the compounds of interest, with the aim of estimating their resistance to electrochemical oxidation in order to then select the most appropriate oxidant (or mixture of oxidants).

Table 3 below shows the chemical compounds listed in Table 1 wherein, for each compound, the relative oxidation potential is expressed in volts, V, and by convention with respect to the reference N.H.E. (Normal hydrogen electrode).

TABLE 3

| | Chemical compounds and relative oxidation potentials expressed in volt | |
|---|---|---|
| 1 | Benzethonium chloride | 1.90 |
| 2 | Betamethasone acetate | 1.90 |
| 3 | Hydrocortisone | 1.90 |
| 4 | Oxybutynin | 1.90 |
| 5 | Ibuprofen | 1.89 |
| 6 | Ampicillin | 1.83 |
| 7 | Bisoprolol | 1.73 |
| 8 | Diazepam | 1.70 |
| 9 | Telmisartan | 1.62 |
| 10 | Cefaclor | 1.61 |
| 11 | Trimethoprim | 1.50 |
| 12 | Allopurinol | 1.50 |
| 13 | Metoprolol tartrate | 1.46 |
| 14 | Metformin | 1.45 |
| 15 | Ciprofloxacin | 1.42 |
| 16 | Atenolol | 1.40 |
| 17 | Levofloxacin | 1.40 |
| 18 | Nebivolol | 1.38 |
| 19 | 5 fluorouracil | 1.36 |
| 20 | Azithromycin | 1.30 |
| 21 | Lovastatin | 1.30 |
| 22 | Bicalutamide | 1.24 |
| 23 | Atorvastatin | 1.23 |
| 24 | Tetracycline | 1.23 |
| 25 | Lansoprazole | 1.21 |
| 26 | Clarithromycin | 1.20 |
| 27 | Clavulanic acid | 1.20 |
| 28 | Clopidogrel | 1.20 |
| 29 | Sulfamethoxazole | 1.16 |
| 30 | Torasemide | 1.10 |
| 31 | Cefepime | 1.00 |
| 32 | Hydrochlorothiazide | 0.96 |
| 33 | Tolterodine | 0.93 |
| 34 | Acetylsalicylic acid | 0.90 |
| 35 | Loperamide | 0.90 |
| 36 | Naproxen | 0.84 |
| 37 | Diclofenac sodium | 0.82 |
| 38 | Cefazolin | 0.80 |

TABLE 3-continued

| | Chemical compounds and relative oxidation potentials expressed in volt | |
|---|---|---|
| 39 | Pioglitazone | 0.80 |
| 40 | Estriol | 0.73 |
| 41 | Amoxicillin | 0.65 |
| 42 | Paracetamol | 0.55 |
| 43 | Chloramphenicol | 0.24 |

It is evident that many of the compounds examined have a potential value E°, V greater than one. This indicates that only relatively strong chemical oxidants, such as the compounds listed in Table 2, are able to significantly decompose them.

Some of the compounds listed in Table 2 have, however, been excluded from the selection made by the Inventors of the present application. These include, for example, sodium hypochlorite, potassium dichromate, chlorine, fluorine and potassium permanganate, for the following reasons. The use of sodium hypochlorite was excluded as this compound has a standard potential value comparable with only one third of the chemical compounds listed in Table 3. Potassium dichromate has a standard potential value comparable, however, with most of the substances listed in Table 3 but its use would require adding concentrated acids and, above all, it is a source of chromium, a persistent toxic element. Chlorine also has a standard potential value comparable with many of the substances listed in Table 3, but is highly toxic and risky in its use. Potassium permanganate has a standard potential value comparable with many of the substances listed in Table 3, but would require, for its use, the addition of concentrated acids. It also triggers secondary reactions that lead to the formation of brown manganese dioxide, and cleavage of the carbon-carbon bonds of the neighboring diols, resulting therefore aggressive with cellulose. Regarding fluorine, however, although it has the highest standard potential value, it is highly toxic and corrosive.

The oxidizing compounds, in particular, from the compounds listed in Table 2, net of the preferably excluded compounds, are therefore selected from ozone, monopersulfate, hydrogen peroxide, and persulfates, percarbonates, sodium potassium or ammonium perborates. These compounds have standard potentials greater than 1.8V, and, therefore, have been considered potentially suitable for oxidizing the compounds listed in Table 3, most of which have lower potential values. Furthermore, these oxidizing compounds offer the advantage that after, or even during their use, they do not leave, or release, toxic and/or irritating residues, such as those excluded.

The Inventors of the present application have, therefore, focused attention on identifying the operating limit conditions (for example, oxidation potential, concentration, temperature, and times) that may allow obtaining the highest percentage of decomposition of the selected chemical compounds. As for the oxidation potential, given the data reported in Table 3, it is reasonable to hypothesize that only at the oxidation potential value of at least 1.9V, a high degradation by chemical oxidation of the same substances chosen as indicators is desirable. This hypothesis has been verified:

1. By direct chemical oxidation conducted in the homogeneous phase, i.e. aqueous solution at 100° C. with MPS and KPS, oxidants with potential greater than 1.9V. However, the action of these oxidants in the homogeneous phase is too ideal compared to their real action instead carried out on the surface.

2. By electrochemical oxidation, conducted in a heterogeneous phase, on the surface, by means of a three-electrode potentiostatic circuit of a cell operating at the controlled potential of 2.0V, a value close to that of the strongest chemical oxidants.

Figure 7:
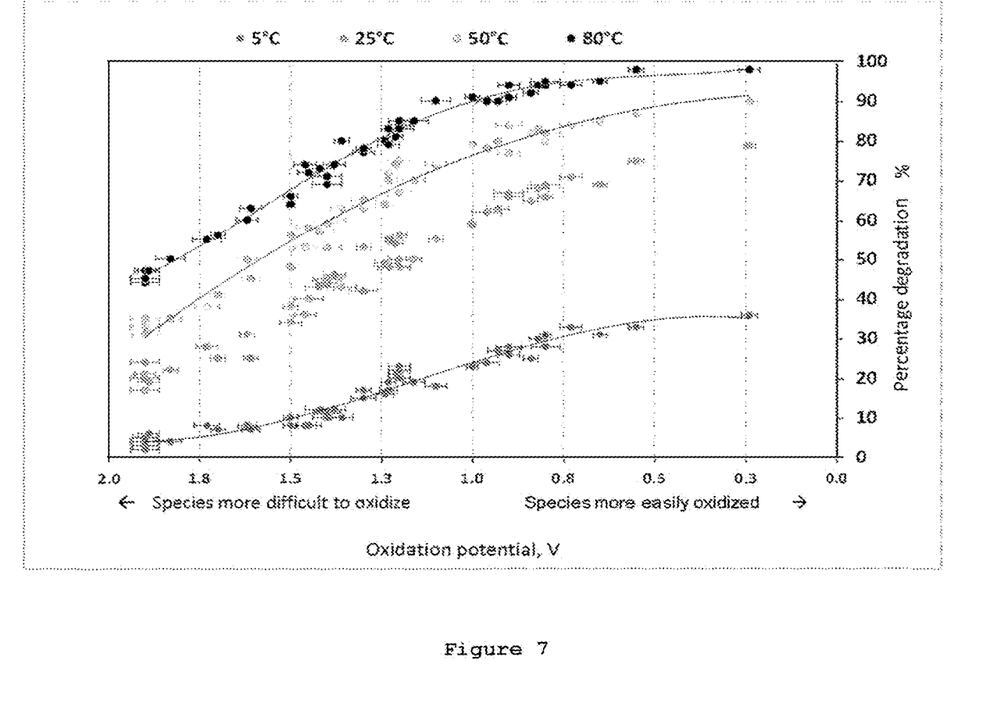
FIG. 7 represents the graph that illustrates the percentage of degradation of 43 chemical compounds as a function of their oxidation potential, if they are subjected to an oxidation reaction at 2.0V potential.
Figure 8:
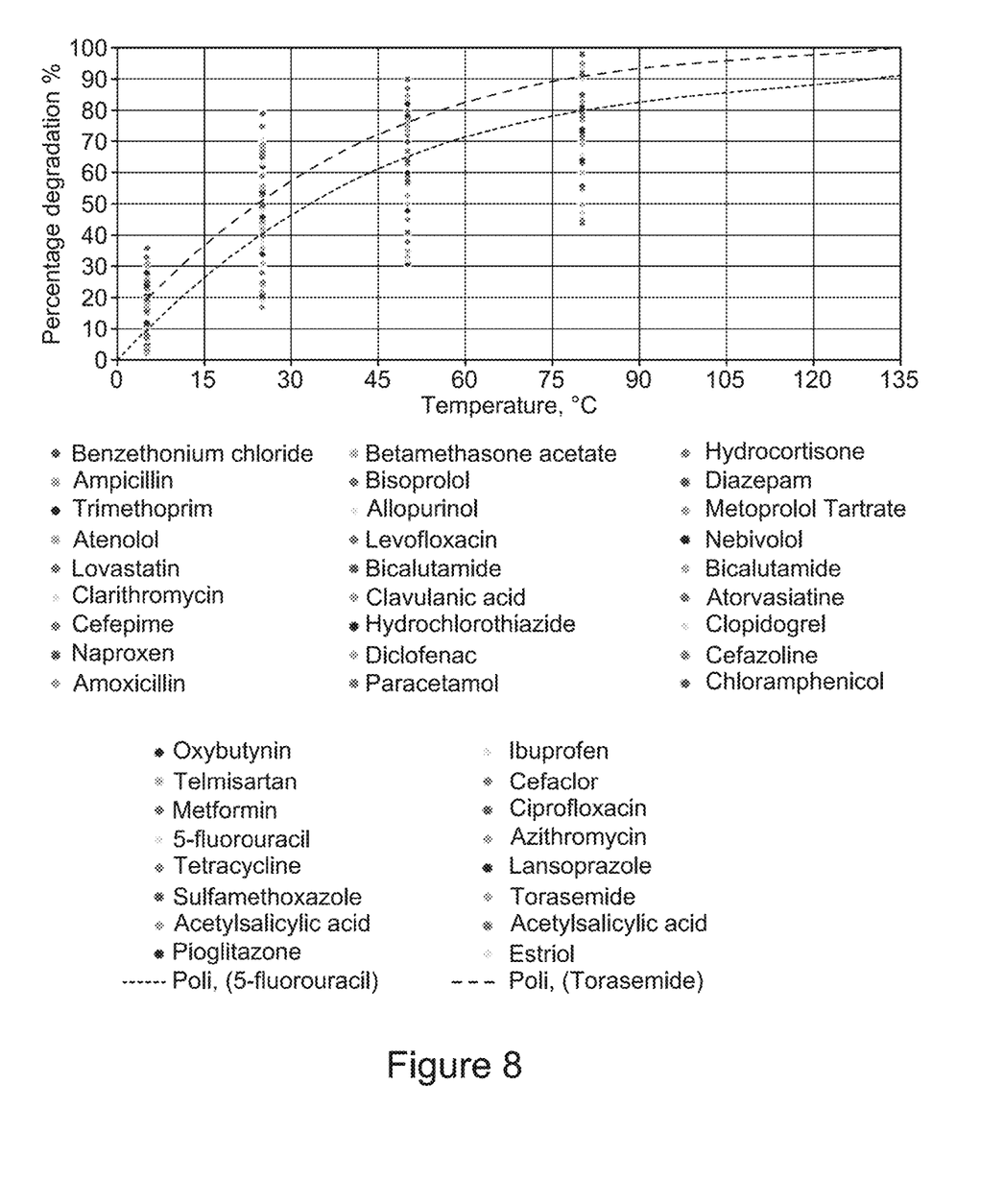
FIG. 8 represents the graph that illustrates the percentage of degradation of 43 chemical compounds as a function of temperature, due to the combined oxidation-temperature effect.

The percentage of degradation for each species has been determined by analytical quantification of the unchanged recovered residue downstream of the oxidation process performed at +2.0V. The oxidations were carried out at four different temperatures in order to then extrapolate the degradation percentages even at higher temperatures, not achievable on a laboratory scale, and produced the cumulative graphs of FIGS. 7 and 8. The graph in FIG. 7 indicates the percentage of degradation of the compounds reported in Table 1, as a function of their oxidation potential, and is of general validity in light of the extensive correlation to 43 compounds. It should be noted that an electrooxidation at +2.0V (and T above 50° C.) is expected to produce a decomposition of more than 80% only for those species having potential values lower than 1V. This potential value is a value compatible with that of oxidizing compounds such as MPS, KPS and related compounds (Table 2). It is also clear that, at 2V, only above 80° C. and only for compounds with low oxidation potentials is it possible to obtain effective decompositions. The same degradation percentage data obtained by oxidizing at 2V, at four different temperatures, and for 43 substances, can be reported according to the temperature. The extrapolation of the experimental data at higher temperatures suggests that a chemical oxidant operating at about 2V is able to decompose—at 135° C.—over 99% of the species that have a oxidation potential less than at least 1.1V operating at 1 atm (FIG. 8). FIG. 8 precisely illustrates the percentage of degradation of compounds reported in Table 3, as a function of temperature, due to the combined oxidation-temperature effect.

It should be noted that only from i-th species with oxidation potential less than at least 1.1V, a limit decomposition can be expected (at temperatures of 135° C.) higher than 99%, by an oxidant with potential of at least +2.0V; the potential of 2V is compatible with compounds such as ozone, persulfates, monopersulfates, and peroxides such as hydrogen peroxide or its analogues.

Efficacy Test

The effectiveness of decontamination of chemical compounds carried out by oxidizing compounds selected on the basis of the criteria reported in the previous section was tested on post-metabolic residues present in untreated (raw material) post-consumer absorbent sanitary products, on post-consumer absorbent sanitary products fortified with the compounds listed in Table 1, and on post-consumer cellulose recovered during separation and fortified with the compounds listed in Table 1. The latter material is best suited for testing as it is the most absorbent component of absorbent sanitary products.

Potassium Monopersulfate (MPS or Potassium Peroxymonosulfate)

The potassium monopersulfate (provided by PeroxItalia, or by United Initiators) was placed in an aqueous solution in the autoclave during the sterilization step in a quantity equal to or greater than 10% with respect to the dry weight of the post-consumer absorbent sanitary products. The solid compound (triple commercial salt, of 250 g/L solubility at 20° C.) was dissolved in the minimum quantity of water, weighing an amount equal to or greater than 10% with respect to the dry weight of the fortified material to be sterilized in a concentration equal to 580 $\mu g/K_{ss}$. The dry weight of the material was determined according to the official method 936 UNICHIM 10506/1994. The MPS solution was sprayed onto the material placed in the autoclave, by suction from an external tank carried out in the vacuum phase. The material was subsequently subjected to shredding to generate a final particle size smaller than 10 cm, and then dried.

The decontamination step thus conducted resulted in a decontamination greater than 99%.

A similar result was obtained when potassium monopersulfate in an quantity equal to or greater than 10% with respect to the dry weight of the material was added in solution to the non-fortified post-consumer absorbent sanitary products in conditions of total humidity of the material greater than or equal at 70%.

Potassium Monopersulfate (MPS) in Combination with Ozone

The MPS was placed in an autoclave in the form of a solution sprayed on the fortified material with a final humidity of 70%. The potassium monopersulfate was placed in the autoclave at an amount lower than 10% (weight/weight) compared to the dry weight of the post-consumer absorbent sanitary products. Also in this case, the dry weight of the material was determined according to the official method 936 UNICHIM 10506/1994. Two different quantities were tested, 5% and 8% by weight with respect to the dry weight of the material. The method also envisages the introduction of an ozone flow (15 L/h) in the drying step of the material.

The analyzes carried out on the material thus treated showed a reduction in the level of the compounds added to the material—in a concentration equal to 580 $\mu g/Kg_{ss}$ of 72% and 92%, respectively.

The MPS was placed in an autoclave in the form of a solution sprayed onto fortified recovered post-consumer cellulose with a final humidity of 70% and with a particle size less than 3 cm. The potassium monopersulfate was placed in the autoclave at an quantity of less than 10% weight compared to the dry weight of the material. Three different quantities were tested: 2.4, 4.0 and 5.7% by weight with respect to the dry weight of the post-consumer recovered cellulose. The method also envisages the introduction of an ozone flow (15 L/h) in the drying step of the material.

The analyzes carried out showed a reduction in the level of the compounds added to the recovered post-consumer cellulose—in a concentration equal to 580 $\mu g/Kg_{ss}$—of 80, 98 and >99%, respectively.

Sodium Percarbonate (SPC) in Combination with Ozone

Sodium percarbonate was tested in different quantities, i.e. 4%, 9% and 10% with respect to the dry weight of the material placed in the autoclave, determined according to the official 936 UNICHIM 10506/1994 method.

It was added as a solution to the fortified material, which had a total humidity of greater than 45±5%. The material was subsequently subjected to shredding to generate a final particle size less than 10 cm.

The method also envisages the introduction of an ozone flow (15 L/h) in the drying step of the material.

The analysis conducted on the material thus treated showed that the decontamination stands at a percentage of reduction of the contaminants (added at a concentration of 580 $\mu g/Kg_{ss}$) equal to 78%, 95% and 97%.

Hydrogen Peroxide

The action of hydrogen peroxide ($H_2O_2$) was tested on a laboratory scale on post-consumer cellulose, recovered in the separation step, fragmented with dimensions not exceeding 3 cm, polluted at a concentration of 1000 $\mu g/Kg_{ss}$ (overspiking) and then treated under the conditions of total humidity, concentration, temperature and time of action as indicated in Table 4 below.

TABLE 4

| N | T, °C. | % $H_2O_2$ weight/weight | Duration (hours) | Humidity (%) | COD mg/L |
|---|---|---|---|---|---|
| 1 | 130 | 89% | 2 | 81% | 74 |
| 2 | 130 | 100% | 2 | 75% | 80 |
| 3 | 130 | 89% | 1.5 | 70% | 87 |
| 4 | 60 | 89% | 5 | 53% | 75 |
| 5 | 60 | 59% | 8 | 60% | 80 |
| 6 | 130 | 26% + 5% MPS | 2 | 68% | 95 |
| 7 | 60 | 89% + 5% MPS | 2 | 53% | 79 |
| 8 | 130 | 26% | 2 | 68% | 145 |
| 9 | 130 | 26% | 2 | 68% | 132 |
| 10 | 130 | 26% | 2 | 68% | 124 |
| 11 | 60 | 45% | 11 | 64% | 106 |
| 12 | 130 | 0% + 10% MPS | 2 | 83% | 206 |
| 13 | 100 | 26% | 2 | 68% | 253 |
| 14 | 60 | 30% | 15 | 67% | 182 |
| 15 | 130 | 0% + 10% MPS | 2 | 68% | 335 |
| 16 | 70 | 26% | 2 | 68% | 308 |
| 17 | 130 | 0% + 5% MPS | 2 | 68% | 425 |

Conditions of oxidative treatment carried out on recovered post-consumer cellulose, treated on a laboratory scale (100.0 g of material). The % value is intended as the weight ratio between the $H_2O_2$ alone and the treated dry cellulose. Total humidity also considers the water produced by the decomposition of $H_2O_2$. Reactor placed at 1 bar.

It was chosen to initially evaluate only the COD value (chemical oxygen demand), which already represents the quantity of oxygen necessary for the complete chemical oxidation of the organic and inorganic oxidizable compounds possibly present in the aqueous matrix, extracted from the material subjected to decontamination. A high value of this parameter (>160 mg/L), is considered a sufficient condition to state that the content of organic residues is also high, downstream of chemical analyzes aimed at the post-process identification of the compounds listed in Table 1, and related derivatives.

An oxidative treatment that has caused a reduction in the value of the chemical compounds greater than 99% corresponds to a detected COD value lower than 100 mg/L (tests from 1 to 7 listed in Table 4), at net of the blank, i.e. the value found on equal treatment but carried out on uncontaminated cellulose.

The tests conducted demonstrate the effectiveness of the hydrogen peroxide used both alone and in combination with potassium monopersulfate.

Particularly effective decontamination has been observed for compositions comprising hydrogen peroxide as the only oxidizing compound in an amount greater than 50% with respect to the dry weight of the material to be decontaminated. The optimal application time involved a period of at least 1.5 hours at a temperature not lower than 60° C. with a percentage of overall water not less than 53%.

Compositions comprising hydrogen peroxide, in combination with potassium monopersulphate, caused a significant decontamination of chemical compounds, even greater than 99% (COD values<100 mg/L).

For example, advantageous results have been obtained with compositions comprising hydrogen peroxide in an amount equal to or greater than 26% with respect to the dry weight of the material and potassium monopersulfate in an amount equal to at least 5% with respect to the dry weight of the material.

Decontamination of chemical compounds was particularly effective when the material to be treated had a total humidity greater than 50%.

The role of water is obviously important for the transport phenomena of oxidizing and reducing species. It also preserves the integrity of the material from exothermic phenomena, such as the decomposition of hydrogen peroxide to water and oxygen. Excess water can therefore improve the chemical process.

Decontamination of chemical compounds was particularly effective when the material was treated at a temperature above 60° C.

Particularly advantageous conditions characterized by a reduction of the chemical residues even higher than 99% in the fortified samples are compatible with the conduction of the chemical decontamination step in the different steps of the method as illustrated in FIGS. 3 to 6.

Furthermore, treatment with hydrogen peroxide also allowed a bleaching effect of the treated material to be obtained, which occurs following the chemical transformation of the contaminating residues into volatile decomposition products.

Of course, without prejudice to the principle of the invention, the details of construction and the embodiments may be widely varied, without thereby departing from the scope of the invention as defined by the claims that follow.

The invention claimed is:

1. A method for sterilizing and decontaminating post-consumer absorbent sanitary products polluted with organic compounds derived from human metabolism comprising drug residues, said post-consumer absorbent sanitary products containing one or more fractions of plastic, super-absorbent polymers (SAP), and cellulose, the method comprising at least the steps of:
   sterilizing (SR) said post-consumer absorbent sanitary products by heating to a temperature equal to or lower than 140° C. and treatment at pressure lower than 4 bar, and
   decontaminating (DC) said post-consumer absorbent sanitary products of said organic compounds derived human metabolism comprising drug residues by means of treatment with an oxidizing composition, wherein said oxidizing composition is an aqueous solution consisting of hydrogen peroxide and potassium monopersulfate, wherein a weight ratio of hydrogen peroxide: potassium monopersulfate is between 3:1 and 20:1,
   wherein said hydrogen peroxide and/or potassium monopersulfate is in said oxidizing composition in an amount equal to or greater than 2% by weight with respect to a dry weight of the post-consumer absorbent sanitary products.

2. The method according to claim 1, also comprising the step of:
   shredding (SH) said post-consumer absorbent sanitary products and obtaining shredded post-consumer absorbent sanitary products having a particle size less than 10 cm.

3. The method according to claim 2, further comprising the step of drying (DR) said shredded post-consumer absorbent sanitary products, and obtaining shredded and dried post-consumer absorbent sanitary products containing at least plastic, super-absorbent polymers (SAP) from the group including plastic, super-absorbent polymers (SAP), and cellulose.

4. The method according to claim 3, wherein the method also comprises the step of separating plastic from said shredded and dried post-consumer absorbent sanitary products.

5. The method according to claim 3, wherein the method also comprises the step of separating cellulose from said shredded and dried post-consumer absorbent sanitary products.

6. The method according to claim 3, wherein the method also comprises the step of separating said super-absorbent polymers (SAP) from said shredded and dried post-consumer absorbent sanitary products.

7. The method according to claim 1, wherein the step of decontaminating (DC) of organic compounds derived from human metabolism comprising drug residues is carried out by treating the post-consumer absorbent sanitary products with the oxidizing composition simultaneously with the sterilizing step (SR).

8. The method according to claim 2, wherein said decontaminating (DC) step is carried out by treating the post-consumer absorbent sanitary products with the oxidizing composition simultaneously with the shredding step (SH).

9. The method according to claim 3 wherein said decontaminating (DC) step is carried out by treating the shredded post-consumer absorbent sanitary products with said oxidizing composition simultaneously with said drying step (DR).

10. The method according to claim 1, wherein the post-consumer absorbent sanitary products are treated with said oxidizing composition at a temperature higher than 50° C.

11. The method according to claim 1, wherein said hydrogen peroxide is present in the oxidizing composition in an amount greater than 5% by weight with respect to the dry weight of said post-consumer absorbent sanitary products.

12. The method according to claim 4, wherein said decontaminating (DC) step is carried out by treating said plastic and/or said cellulose separated from said shredded and dried post-consumer absorbent sanitary products with said oxidizing composition.

13. The method according to claim 12, wherein the hydrogen peroxide and/or potassium monopersulfate is in the oxidizing composition in an amount equal to or greater than 2% by weight with respect to a weight of said plastic and/or cellulose separated from said shredded and dried post-consumer absorbent sanitary products.

14. The method according to claim 13, wherein said hydrogen peroxide is present in the oxidizing composition in an amount greater than 5% by weight with respect to the dry weight of said post-consumer absorbent sanitary products.

15. The method according to claim 1, wherein said sterilizing step (SR) is carried out by heating said post-consumer absorbent sanitary products to a temperature between 120° C. and 140° C. and to a pressure comprised between 1 and 3.6 bar.

* * * * *